United States Patent
Üstün

(10) Patent No.: US 8,042,336 B2
(45) Date of Patent: Oct. 25, 2011

(54) DEVICE FOR THE STORAGE OF HEAT ENERGY FOR SUBSEQUENT CONVERSION INTO ELECTRICAL ENERGY

(76) Inventor: Orhan Üstün, Bülach (CH)

( * ) Notice: Subject to any disclaimer, the term of this patent is extended or adjusted under 35 U.S.C. 154(b) by 636 days.

(21) Appl. No.: 10/593,000

(22) PCT Filed: Mar. 15, 2004

(86) PCT No.: PCT/CH2004/000153
§ 371 (c)(1),
(2), (4) Date: May 9, 2007

(87) PCT Pub. No.: WO2005/088123
PCT Pub. Date: Sep. 22, 2005

(65) Prior Publication Data
US 2009/0064680 A1 Mar. 12, 2009

(51) Int. Cl.
*F02G 3/00* (2006.01)
*F16D 31/02* (2006.01)
*F01K 25/02* (2006.01)
*F02C 1/04* (2006.01)

(52) U.S. Cl. .............. 60/616; 60/650; 60/682; 60/413; 60/416

(58) Field of Classification Search ............... 60/641.8, 60/407–418, 530, 614–624, 650, 641.13, 60/682; 126/271, 437, 440, 561–713; 180/165
See application file for complete search history.

(56) References Cited

U.S. PATENT DOCUMENTS

| | | | | |
|---|---|---|---|---|
| 3,888,084 A | * | 6/1975 | Hawkins | 60/614 |
| 4,107,928 A | * | 8/1978 | Kelly et al. | 60/650 |
| 4,206,608 A | * | 6/1980 | Bell | 60/698 |
| 4,299,199 A | * | 11/1981 | Girone | 126/572 |
| 4,366,674 A | * | 1/1983 | Eakman | 60/618 |
| 4,586,338 A | * | 5/1986 | Barrett et al. | 60/618 |
| 4,628,692 A | | 12/1986 | Pierce | |
| 4,739,620 A | * | 4/1988 | Pierce | 60/641.8 |
| 4,788,823 A | | 12/1988 | Johnston | |
| 5,579,640 A | * | 12/1996 | Gray et al. | 60/413 |
| 6,233,938 B1 | * | 5/2001 | Nicodemus | 60/651 |
| 6,539,711 B1 | * | 4/2003 | Raychinov | 60/413 |

FOREIGN PATENT DOCUMENTS

| | | |
|---|---|---|
| DE | 19924876 | 11/2000 |
| DE | 10061119 | 9/2002 |
| DE | 10208928 | 10/2003 |

* cited by examiner

*Primary Examiner* — Kenneth Bomberg
*Assistant Examiner* — Christopher Jetton
(74) *Attorney, Agent, or Firm* — The Webb Law Firm

(57) ABSTRACT

The invention relates to a device for the conversion of heat energy into another energy form provided with at least one heat input and pressure reservoir module, each comprising a heat-input transmitting device and a pressure reservoir, whereby said device and pressure reservoir are connected to each other for the exchange of fluid and an energy conversion device, connected to the pressure reservoir of the heat input and pressure reservoir module for the exchange of fluid, by means of which the energy built up in the form of fluid pressure in the heat input and pressure reservoir module may be converted into said other energy form.

2 Claims, 3 Drawing Sheets

DEVICE FOR THE STORAGE OF HEAT ENERGY FOR SUBSEQUENT CONVERSION INTO ELECTRICAL ENERGY

The invention relates to an apparatus for the storage of thermal energy for subsequent conversion to electrical energy; in particular the invention also relates to a combined heat and power generation device for the energy storage of solar energy.

DESCRIPTION OF RELATED ART

The prior art has disclosed various insular solutions for generating electrical energy. These often comprise photovoltaic modules for generating electrical energy which is then stored in rechargeable batteries. Another insular solution is also motor vehicles, in the case of which a battery is charged via a generator which is driven via a V belt of the motor which moves the vehicle.

In the case of modern hybrid motor vehicles, an electric motor/generator which draws the electrical energy required from batteries is installed, as is known, as drive assistance in addition to the internal combustion engine. During generator operation, these batteries are charged as buffer stores. The number of these batteries in the vehicle is very severely restricted owing to the amount of space they require and primarily owing to their high weight, which in turn severely reduces the range of the vehicle. In addition, the batteries are damaging to the environment (disposal) and have a relatively short life.

SUMMARY OF THE INVENTION

Against the background of this prior art, the invention is based on the object of specifying an apparatus of the type mentioned initially which has an improved utilization ratio of the energy used.

One further aim of the invention consists in specifying an apparatus, in the case of which the thermal energy can be buffer-stored, in particular in order to save on the rechargeable batteries required in accordance with known solutions or at least to be able to provide them with a lower capacity.

An apparatus according to the invention makes use of an energy conversion device, which is connected to the accumulator of the heat input and accumulator module for the exchange of fluid. For example, a hydraulic motor can then convert the fluid pressure applied from the heat input and accumulator module to another energy form as potential energy. Disadvantages of conventional rechargeable battery-based insular solutions are therefore circumvented in a simple, mechanical manner.

Known vehicles using complex hybrid technology are replaced according to the invention by a more simple technology using components which have long proven successful.

Further advantageous refinements are characterized in the dependent claims.

BRIEF DESCRIPTION OF THE DRAWINGS

The invention will now be described in more detail by way of example with reference to the attached drawings using an exemplary embodiment. In the drawings.

DETAILED DESCRIPTION OF THE INVENTION

Figure 1:
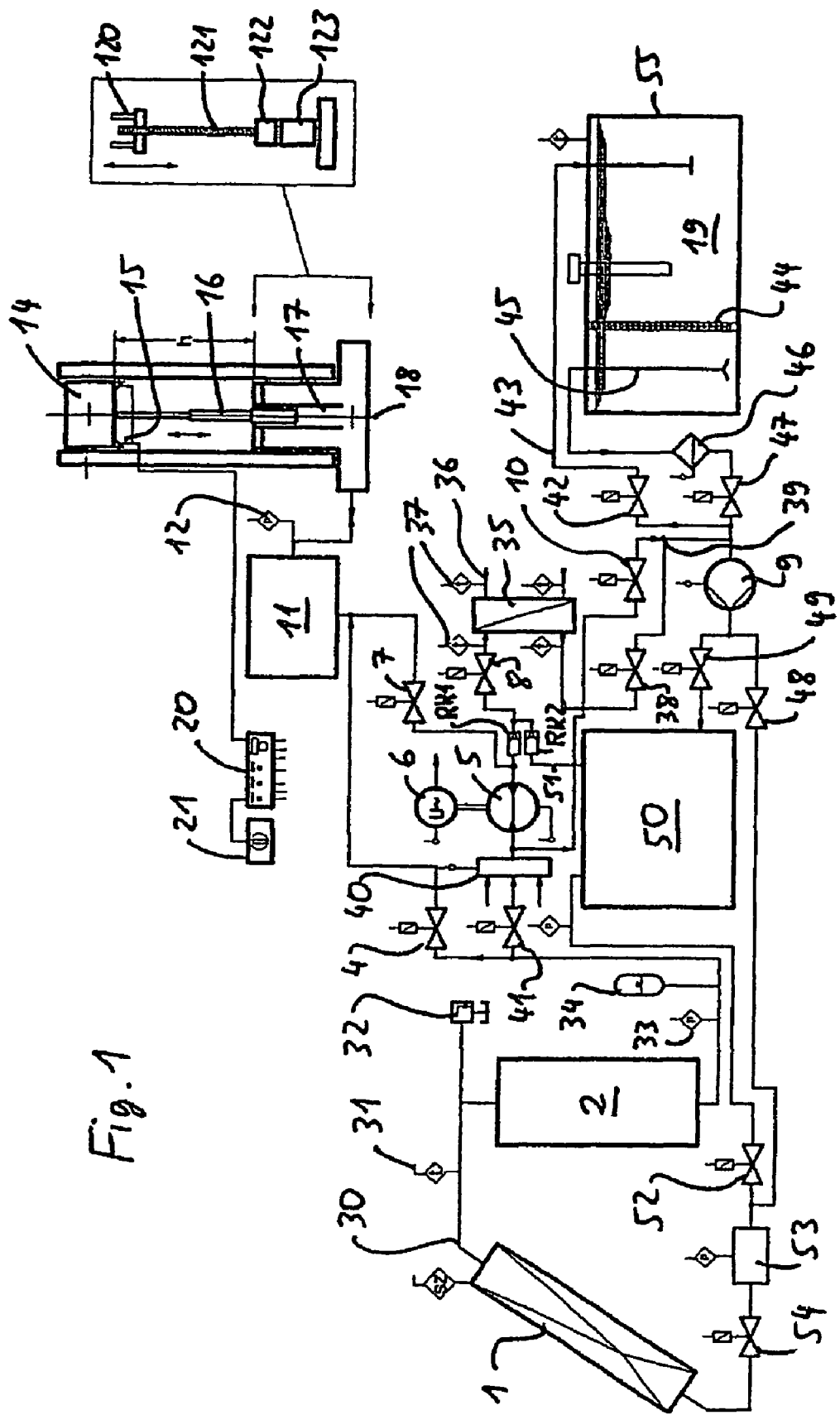
FIG. 1 shows a block circuit diagram of an apparatus for combined heat and power generation in accordance with a first exemplary embodiment of the invention.

FIG. 1 shows a block circuit diagram of an apparatus for combined heat and power generation in accordance with one exemplary embodiment of the invention. In this case, FIG. 1 shows an exemplary embodiment with potential energy storage of solar energy. The principles mentioned below can also be transferred to other exemplary embodiments, as will be explained afterwards.

The apparatus shown in FIG. 1 comprises a solar collector 1, which has a fluid flowing through it which is heated by the incident insulation. The radiated solar thermal energy is absorbed by said fluid in the solar collector 1 such that the temperature of the fluid increases. The expansion in terms of volume which is generally associated with this is avoided by the system of pipes 30 and converted to an increasing pressure. The temperature sensor 31 is connected to the electronic controller 20 of the apparatus and is used for the safety and monitoring of the apparatus. The element SZ on the solar collector is a solar cell for sensing rapid changes in intensity in the incident radiation. The fluid is passed through the pipeline 30 into the store 2 and is pre-stored there as pressure energy. The pressure limitation valve 32 protects the apparatus against an excess pressure which is above the specifications and possibly guides the fluid away directly into the store 19.

The control and regulation device 20 monitors the entire apparatus, including the switch setting of the switch 21. If the switch 21 is not set to the position with the priority "generate current and heat", and the system conditions (in particular but not exclusively it is possible to check: valve states, temperatures and pressures, self-testing of the control device etc.) are met, the shut-off valve 4 guides the pressure energy into the buffer store 11. The valve 4 is switched off when the pressure value of the store 2 (P2) is less than the pressure value of the buffer store 11 (P11). The control/regulating device 20 only switches the valve 4 on again, i.e. opens it, when the pressure condition is met in which the pressure value of the store 2 (P2) is greater than the pressure value of the buffer store 11 (P11). The pressure energy is passed on into the piston chamber 17 of the hydraulic housing 18, and the resultant pressure force drives the weight 14 upwards with the aid of a lifting piston 16 as long as the force condition is met in which the force of the piston 17 (K17) is greater than the force of the weight 14 (K14). If K17=K14, the valve 4 is switched off, i.e. closed. The weight 14 advantageously latches stepwise into the two guide rails 13 guiding the weight 14 with the aid of locking-in latching elements 15, for example via electric lifting magnets (saw-tooth protection).

As an alternative solution, the lifting apparatus 120 indicated in the right-hand box in FIG. 1 and comprising the threaded guide rod 121 and the hydraulic motor 123 with the flange-connected reduction gear 122 can also be used.

In addition, a torque-storing apparatus can also be connected, by means of which a flywheel is driven.

The lifted weight 14 can also be replaced by a vertically pumped liquid, in which case this liquid could directly drive the generator 6 in another connection. In particular, the hydraulic motor 5 can also be used for this purpose as a hydraulic pump/motor combination.

It is essential with this implementation of an exemplary embodiment that the thermal energy present in the form of pressure is converted to potential energy. In principle, this may be displaced masses, tensioned springs, compressed gas volumes or other refinements of potential energy.

If the switch 21 on the other hand is set to the alternative position with "alternate operation", the system is changed over between the two operating modes mentioned above depending on the condition mentioned below being met. In other words, if the current and heat generation is not required temporarily by the operator of the system, the control/regulating device 20 always changes automatically to the "energy storage" operating mode in order to produce as much potential energy as possible, for example for off-peak current generation.

In the evening or, for example, depending on the light demand, if an electrical appliance is switched on, a corresponding sensor signals the demand to the control/regulating device 20 and, once a test has been carried out on the safety functions (corresponding to those mentioned above, for example pressure, temperature and valve states), isolates the two locking-in latching elements cyclically based on demand. The weight 14, which in this case is being lowered, presses onto the piston chamber 17 and as a result generates a pressure energy.

If certain operating conditions (in particular readiness of the inverters and switching state of the electrical distribution box) are met, the shut-off valve 7 guides the pressurized fluid to the hydraulic motor 5. It drives the generator 6, whereupon electricity is generated. Then, the electrical energy thus generated is buffer-stored and smoothed in a heavy-duty capacitor store. The lowering speed of the weight 14 is dependent on the amount of electrical energy drawn by the system.

In summary, the following advantages of this apparatus can be mentioned. The above-described exemplary embodiment allows for an optimum solution to the storage of the energy obtained with the aid of the sun in the form of temporary energy storage. In the case of all insular systems, it reliably and economically replaces the conventional electrical batteries and avoids the disadvantages associated with them, which are in particular as follows:

they are damaging to the environment (corrosive gas formation, heavy-metal content etc.),
disposal is complex (energy-consuming and therefore cost-intensive),
at relatively high capacities (for example more than 50 Ah) they become very heavy (25 to over 100 kilograms) and unwieldy,
they require a considerable amount of space for a relatively high electrical power,
they require maintenance, in the case of relatively large insular systems periodic maintenance,
their specific power density based on weight or volume is relatively low (W/kg),
their life is severely dependent on the number of charge/discharge cycles,
their life is very severely dependent on the amount of current drawn,
they are relatively expensive,
if a defective battery is replaced prematurely, this new battery is "aged" by the others owing to the system.

Further advantages of the use of solar collectors for energy storage are as follows:

solar energy is used, which is free of charge,
in comparison with conventional batteries, there is virtually no damage to the environment,
the "practical" efficiency is more than 100% better than that of a battery,
even at high powers, relatively little space is required,
the apparatus requires little maintenance and is reliable,
its specific power density is high,
it has a long life (>20 years),
its life is practically not dependent on the prevailing load,
the apparatus can be realized in a cost-effective manner using components which have long proven successful,
the costs/utilization ratio is very high,
there is a real contribution to environmental protection with relatively little complexity.

The liquid held by the system of pipes 30 and heated via the vacuum pipe solar collector 1 is, as a result, brought to a relatively high temperature and a relatively high pressure. In this case, there is also a pressure gage 33 which is connected to the control and regulating device 20. In addition to the system of pipes and the store 2, the liquid is also held in a bladder store 34 for avoiding hydraulic impacts.

During operation of the hydraulic motor 5, it is necessary to pay attention to the following details. The displacement volume or lifting volume of the hydraulic motor 5 can be tailored to the storage capacity of the apparatus (see also the scaled effect of the circuits shown in FIG. 2). The hydraulic motor 5 drives the generator 6, downstream of which capacitors (not illustrated in the drawings, in FIG. 2 the capacitor store KS) for smoothing and stabilizing the current generated are generally arranged. In addition to the loads, one or more backup batteries can be provided as an emergency current supply, in particular in order to bridge the startup time of the apparatus. The system voltage can be provided by a dedicated 24-volt system, this 24-volt system advantageously being charged by the apparatus.

After leaving the hydraulic motor, the oil flows through a check valve RK1 into a heat exchanger 35, through which another fluid is passed, cold, via pipes 36 and guided away, heated. Temperature sensors 37 (there are four for measuring the temperature differences) are connected to the control unit 20 and also control, inter alia, the subsequent valve 38. At the point of intersection 39, pipework diverted via the bypass valve 10 directly upstream of the hydraulic motor 5 meets the liquid which has passed through the heat exchanger.

If the pressure ratios upstream and downstream of the hydraulic motor 5 are equal, the valve 41 upstream of the distribution unit 40 closes. The valves are advantageously in each case electromagnetically operated valves.

The system is advantageously controlled by a switch 21 offering two alternatives; either energy is stored or current/heat is produced.

The liquid flows via a valve 42 and a return pipe 43 into a return chamber 19 of the collecting tank 55. This tank 55 is divided into two parts by an abatement plate 44, in the second chamber, the suction chamber, a suction pipe 45 taking up the abated liquid and guiding it via a filter 46 and a switching valve 47 to the circulation pump 9.

The circulation pump 9 is connected on the output side to two valves 48 and 49, it guiding the warm liquid via the valve 49 into the secondary store 50, from where the liquid is guided via the line 51 in the cycle through the heat exchanger 35 until the liquid has cooled down and the required pressure drop downstream of the hydraulic motor falls. Then, the circulation pump 9 is switched off. The electromagnetic valves 38, 42 open, while all the other adjacent valves 10, 47, 48, 49 remain closed. The surface tension of the largely precooled liquid is further reduced, and the liquid flows into the return chamber 19.

The circulation pump 9 is only switched off when the temperature difference in the secondary circuit of the heat exchanger 35 has reached a predetermined lower value. The run time of the circulation pump 9 depends in particular on the liquids used; the specific heat of oil in the primary circuit is therefore half as great as that of the water in the secondary circuit of the heat exchanger 35.

Once the valve 52 has opened, if liquid or the required initial pressure has fallen below a specific value in the buffer store and in the primary store 2, the secondary store 50 is connected to the solar collector module 1 via a buffer store 53 and a further valve 54.

There are two states, a cold state and a warm state. In the cold state, liquid is present in the elements 53, 1 and 2. The valves 49, 48, 38, 10 and 42 on the pump side and the valves 52, 54, 41, 4 on the collector side are closed. The control/regulating device 20 first causes the valve 47 to open. Very soon after the minimum static initial pressure of the pump 9 has been reached, the pump 9 and, with a short delay, the valve 48 are switched on. The liquid enters the tank 53; after a short delay, the valve 54 is caused to open. Then, the valves 41, 8, 38 open one after the other and, in the sequence mentioned, the valves 48 and 47 close, at the same time the pump 9 being switched off. While the liquid flows via the hydraulic motor 5, the check valve RK1, the valve 8, the heat exchanger 35 and the valve 38 to the point of intersection 39, the valve 42 is switched on. Some of the liquid then flows back into the collecting tank 55. This process is repeated at short time intervals for example approximately three to five times and makes possible perfect ventilation of the system in the starting phase.

In the warm state, the pump 9 conveys the missing liquid proportion via the secondary store 50 from the primary store 2, which has output or "lost" it via the hydraulic motor 5. The valves 38, 10, 42, 47, 49, 48, 52, 54 and 41 are closed. The control/regulating device 20 first switches the valve 47 on and then the pump 9. Afterwards, the valves 49, 52, 54, 41, 8 and 38 are switched on successively in this sequence. The relatively warm liquid flows from the secondary store 50 into the tanks 53, 1 and 2. The secondary store 50 is at the same time supplemented via valve 49 by the collecting tank 55. This intermittent charging process lasts until the pressure values in the primary store 2 and in the secondary store 50 are equal. Afterwards, the valves 41, 54, 52, 48, 49, 38, the pump 9 and the valve 47 are switched off successively. The liquid which is present in the tanks 1 and 2 can be heated up again by means of solar radiation in order to make a new cycle possible, expanded.

This operating method also has the advantage that the necessary heating of the volumes in 1 and 2 is accelerated depending on the type of radiation, or the downtimes of the hydraulic motor 5 become shorter.

At a high level of radiation, the cycle via the store 50 and the heat exchanger 35 is opened for longer in order to build up a higher pressure drop. At a low level of radiation, warmer fluid is left in the store 50 in order to achieve then slower heating in the collector 1 over a shorter period of time.

The mode of operation of this apparatus is intermittent; the hydraulic motor 5 can only be operated, or the storage via the potential energy 14 can only be driven forwards when a corresponding pressure has been built via the solar collector. The higher the level of thermal radiation, the more quickly the cycles can follow on from one another.

Figure 2:
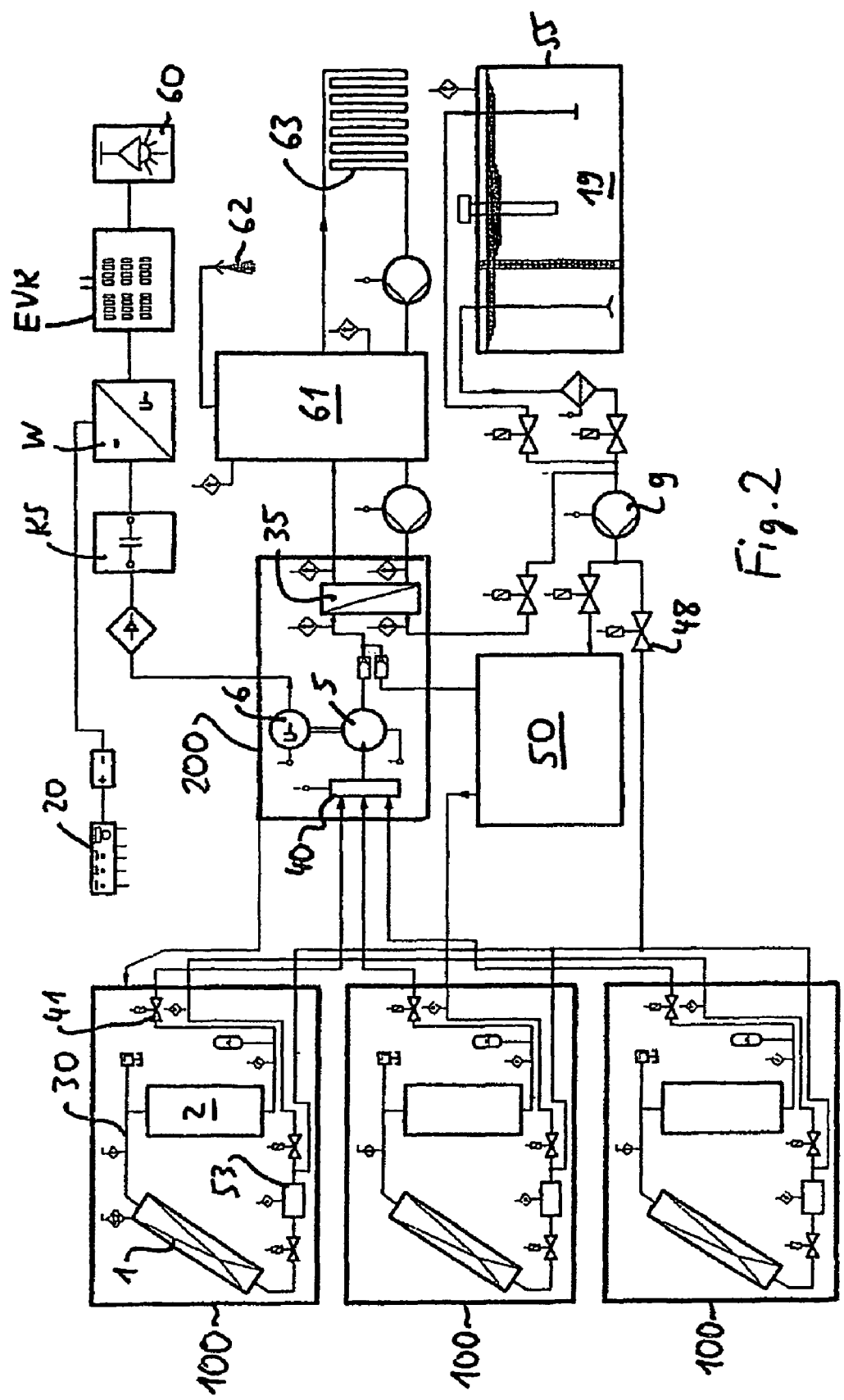
FIG. 2 shows a block circuit diagram having a plurality of solar collector and accumulator modules as shown in FIG. 1.

FIG. 2 shows a block circuit diagram with a plurality of solar collector and accumulator modules, which can be used in particular given a weak input of energy of, for example, from 50 to 500 watts per square meter.

FIG. 2 illustrates three solar collector and accumulator modules 100, which all each have a solar collector 1 and an accumulator 2 with the corresponding pipework and circuitry as shown in FIG. 1. On the output side, the valve 41 is essential. All the valves 41 of the various modules 100 are connected to various inputs of the distribution unit 40. Together with the hydraulic motor 5, the generator 6 and the heat exchanger 35, this device forms a conversion module 200.

Instead of a storage apparatus for potential energy in the form of mechanical energy, FIG. 2 illustrates a conventional load circuit, which ultimately drives a load 60. The reference symbol 61 denotes a heating store with an integrated boiler, whose warmed water can be output as a shower 62 and/or can flow through heating elements 63. In particular, the return chamber 19 and the secondary store 50 are provided only once.

The series connection of the individual modules 100 means that the hydraulic motor 5 can run continuously. The number of modules 100 can naturally be scaled freely. In this case, the control circuit 20, which also controls the modules 100, can always select the module by opening the valve 41 whose pressure is in each case the greatest according to the pressure gage 33.

The higher the temperature of the fluid, the lower the efficiency of the collector 1. The maximum operating temperature is therefore limited in the range from 80 to 95. At a sufficient radiation of 800 to 1000 watts per square meter, the in this case three modules 100 are advantageously operated in an overlapping manner, i.e. the operating phases (unblocking of the valve 41) overlap one another. It is then essential that the heat exchanger 35 can build up the temperature of the liquid rapidly enough that the preparation times are as short as possible. A person skilled in the art will adjust the regulation such that the measured values of the pressure drop, the fluid temperature, the current level, the temperature difference (cooling) of the heat dissipation are set in the correct ratio for a continuous operating sequence. At relatively low radiation values, solar collectors with a lower fluid uptake and therefore reduced flow rate can be used.

At approximately 4.5 square meters of solar collector area 1 of a known design in three modules 100 there is a thermal connection power of 3.3 kilowatts and an electrical connection power of 1.3 kilowatts with a peak of 1.5 kilowatts. The annual 230-volt alternating current production may be 1500 kilowatt hours.

Figure 3:
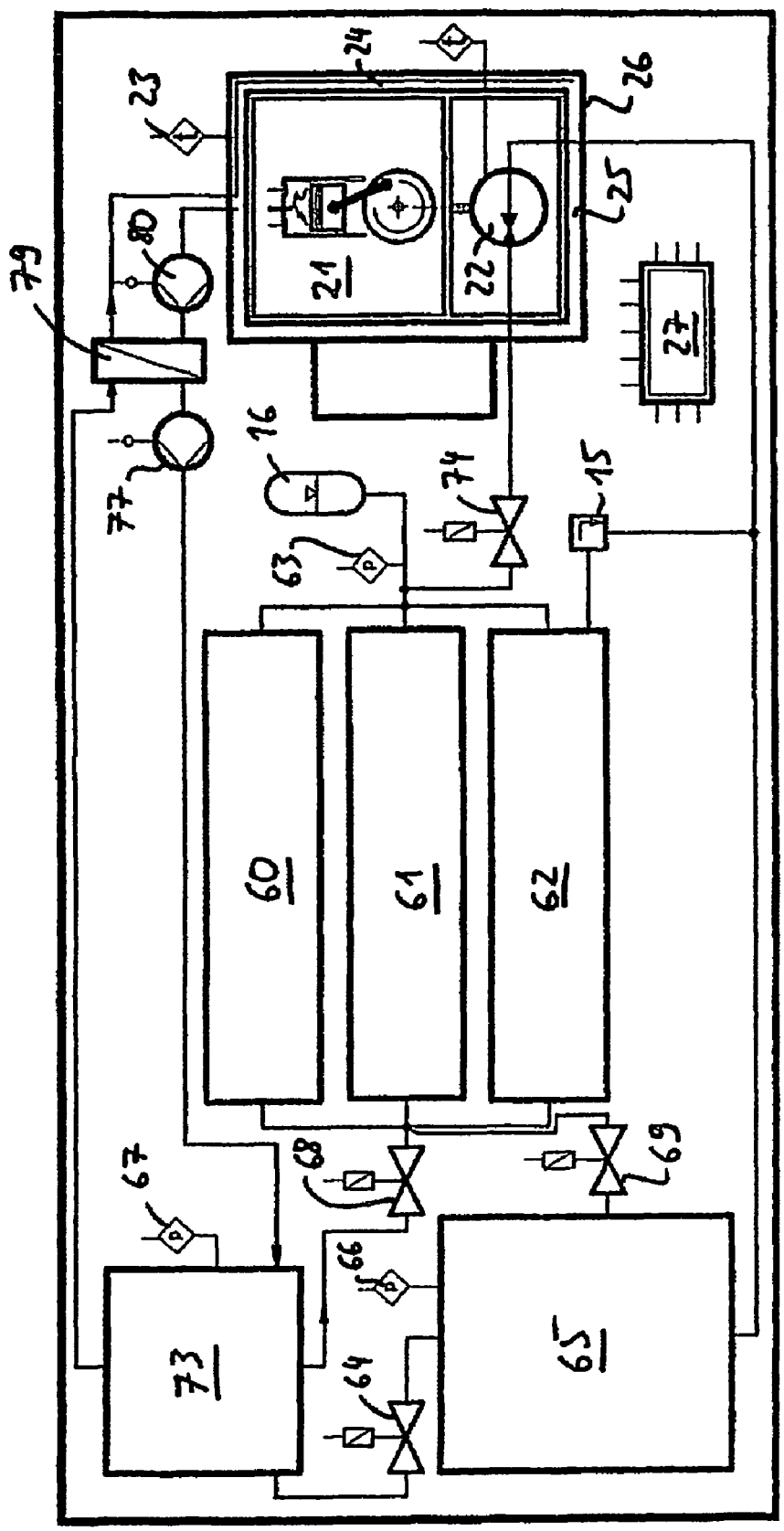
FIG. 3 shows a block circuit diagram of an apparatus for combined heat and power generation in accordance with a second exemplary embodiment of the invention.

FIG. 3 shows a block circuit diagram of an apparatus for combined heat and power generation in accordance with a second exemplary embodiment of the invention. This other exemplary embodiment illustrated here relates to the generation of energy using the heat loss from an internal combustion engine and the retarding energy of a motor vehicle. In this case, an internal combustion engine of a motor vehicle is used instead of a solar collector.

In this case, the energy is generated using the output heat from an internal combustion engine as the device transmitting a heat input.

It is a known fact that from 60 to 70% of the amount of fuel consumed in modern internal combustion engines is lost as output heat. In addition to the costs for these fuels which are not converted to energy used for forward movement, there are also consequences in terms of global warming and its concomitant factors in the form of natural catastrophes which cannot be overlooked.

The hybrid motor 24 illustrated in FIG. 3 comprises the drive components of the known internal combustion engine 21 with gas, petrol, diesel fuel or alternative fuels such as rapeseed etc. and, as drive assistance, the hydraulic motor drive 22. The common transmission 18 combines the two drives and synchronizes them.

The thermal insulation 26 surrounding the two units 21 and 22 largely prevents the output radiation losses in contrast with the conventional internal combustion engine. The heat transfer liquid 25 integrated in the thermal insulation 26 stores a large proportion of the combustion heat. Above a certain temperature, which can be fixed by the temperature sensor 23, the combustion heat stored in the heat transfer liquid 25 is circulated by the pump 80 via the heat exchanger 79. Another fluid, in particular an oil, is circulated on the secondary side using the opposing-flow method by the pump 77, this liquid essentially absorbing the combustion heat from the engine. The liquid which expands relatively severely as the temperature increases is pre-stored in the buffer store 73, preferably arranged beneath the vehicle floor. The control and regulating device 27 monitors the apparatus and the safety criteria. Above a specific pressure value, recorded by the pressure gage 67, the shut-off valve 68 is switched on. The hydraulic liquid flows at a relatively high rate into the steel pressure bottles 60, 61 and 62, which are likewise fixed beneath the vehicle floor.

During the inflow phase, the valve 64 is unblocked at the correct point in time and a precisely metered amount of oil at a relatively low pressure, measured by the pressure gage 66, flows with the suction force of the collecting and compensating tank 65, advantageously likewise arranged beneath the vehicle floor, into the buffer store 73 in order to supplement the liquid. The valve 68 is blocked again.

The above-described heating and charging phases are repeated until the required pressure value, which can be fixed by the pressure gage 63, has been reached in the pressure bottles 60 to 62. The control and regulating device 27, preferably with multi-fold, in particular two-fold redundancy such that failures of a circuit can be compensated for by a further circuit, switches the valve 74 on after a test has been carried out on the safety functions mentioned in relation to the other exemplary embodiment and whilst taking into account the operating sequences (in particular stop-and-go operation, downward travel or braking, switched-off motor).

The oil flowing out of the bottles 60, 61 and 62 flows through the hydraulic motor 22 at a relatively high pressure and in a sufficient amount and flows back into the collecting and compensation tank 65 in order to again start the new cycle. The hydraulic motor 22 rotates concomitantly and passes on its drive energy to the transmission 18, its operation continuing at varying intervals. Decisive parameters are the pressure and the amount.

Instead of a heat input by means of solar energy, in this case the output heat of the conventional engine is used. This corresponds to the same procedure as in the exemplary embodiment shown in FIGS. 1 and 2 and all of the principles of the description relating thereto can also be applied here and vice versa. In particular, a plurality of separate pressure bottles 60, 61 and 62 can be charged, and the stored pressure can be made accessible to the hydraulic motor 22 via a distribution unit. A generator can be connected to the hydraulic motor 22 in order to generate the vehicle's electricity.

The application is naturally not restricted to motor vehicles. It can likewise be applied to rail-mounted vehicles, ships or aircraft. The exemplary embodiment is particularly advantageous since a moving vehicle represents per se an "island" with respect to energy conversion, for which island this independent conversion unit is particularly advantageous.

In addition, in the case of a motor vehicle, it is also possible to generate energy using the retardation energy. In the case of a motor vehicle, one talks of the existence of retardation energy if the motor does not experience any fuel supply, i.e. in particular the gas pedal is not actuated and therefore a function of an engine brake is present.

This type of energy generation can optionally be used as a welcome addition to the energy generation using the engine heat loss. Travel retardation is, as is known, a frequently arising side effect in road traffic. It usually occurs when traveling downhill, when removing the gas and when braking the vehicle. This useful energy component has until today been mechanically destroyed in the case of light vehicles and has therefore been lost unused.

The invention makes it possible to use these energy components in a manner which is expedient in terms of energy and economy. The mode of operation of a corresponding apparatus in accordance with one exemplary embodiment is as follows.

During pumping operation, i.e. when the accumulators 60, 61, 62 are charged, which always takes place in order of priority, a driver of a motor vehicle now takes his foot away from the gas pedal. The regulating and control device 27 continuously monitors the functional sequences. If certain operating conditions are met, for example the temperature of the hydraulic motor 22, the pressure of the overflow oil line of the hydraulic motor, the rotation speed of the hydraulic motor, the pressure in the bottles 60, 61 and 62, and if, after for example five seconds, the brake pedal is not actuated, the hydraulic motor 22 is switched over to act as a hydraulic pump. Subsequently and after a very short period of time, the shut-off valve 74 is unblocked. The oil which is located in the collecting and compensation tank 5 is sucked away and is then introduced into the steel pressure bottles 60, 61 and 62 under pressure.

The compressibility of the contents of the in this case three pressure bottles is primarily dependent on the rotation speed of the hybrid drive and the pumping duration. If the desired filling pressure of greater than or equal to 300 bar is achieved or this operating sequence is necessarily interrupted, first the valve 74 and, after a very short period of time, the hydraulic pump 22 are switched off. The bladder store 76 in the process eliminates the hydraulic impacts to a large extent. The above-described mode of operation is the solution which is regarded to be the most efficient for energy recovery in one exemplary embodiment of the invention.

Energy recovery with the heat loss from an internal combustion engine combined with the utilization of the retardation energy from the same vehicle opens up new horizons with considerable advantages:

the output heat of the engine is used expediently,
the retardation energy from the vehicle is used efficiently,
the total efficiency of the engine is therefore considerably increased,
the fuel consumption can be considerably reduced given the same power, which has an advantageous effect on environmental protection and the reduction of $CO_2$ emissions,
costs per kilometer or travel costs are considerably reduced,
the braking response of the vehicle is improved,
the life of the brakes and the clutch is extended,
the coldrunning properties with respect to the reduction of the consumption and wear of engines are considerably improved because engine standstill heat is stored efficiently since a motor vehicle engine consumes up to 300 percent more fuel in the warmrunning phase (5 to approximately 15 minutes in duration) depending on the time of year and the air temperature, in the case of stop-and-go traffic in traffic jams or in the city at a walking pace, the engine running time or the number of starts and stops is reduced (reduction of consumption and wear in respect of environmental protection and susceptibility to repair work).

Energy recovery in accordance with the exemplary embodiment of the invention avoids all of the abovementioned disadvantages.

Various types of oil and liquid come into consideration as hydraulic liquids. Hydraulic oils of the classes HL and HLP and hydraulic liquids in accordance with DIN 51502 (groups HFC, HFA and HFD) and heat exchanger oils are mentioned as a nonrestrictive selection. In principle, the apparatus can also be operated using fluids in the form of gases. In this case, however, there will be a poorer efficiency.

The viscosity range of the liquids may be, for example, between a minimum of 10 cSt and a maximum of 300 cSt (1 cSt=1 mm$^2$/s). However, liquids with viscosities of 400 cSt or more can also be used.

The liquids in the primary cycle can be operated in various pressure ranges, use having been made of the following pressure ranges in the exemplary embodiments. In the exemplary embodiment with the solar collector in a solar combined heat and power generation device: between 15 and 200 bar. In the case of the energy store, pressures of between 15 and 250 bar can be used. In the case of energy recovery, in particular pressures of from 50 to 300 bar can be used.

A wide variety of types can be used as hydraulic motors, for example external-gear motors with a displacement capacity range of between 1.2 and 5 cm$^3$/revolution (depending on the size of the system) or internal-gear motors/pumps with a displacement capacity range of between 5.1 and 10 cm$^3$/revolution (depending on the size of the system), and, in the case of energy recovery, volumes of above 10 cm$^3$/revolution can be used. For other application cases, axial-piston motors can also be used.

The invention claimed is:

1. An apparatus for converting thermal energy to another energy form comprising at least one heat input and accumulator module, each heat-input and accumulator module comprising:
   a device transmitting a heat-input, and
   an accumulator,
   the device and accumulator being connected to one another for heat exchange via a hydraulic liquid,
   wherein the energy that is built up as fluid pressure in the heat input and accumulator module is converted to the other energy form by means of an energy conversion device, wherein the energy conversion device is a hydraulic motor which is connected with a gear unit of the apparatus, wherein the device transmitting a heat input is an internal combustion engine, the internal combustion engine being connected with the gear unit of the apparatus,
   wherein pressure bottles are provided for intermittent storage of pressurized hydraulic liquid, the combustion heat from the engine being essentially absorbed in the pressurized hydraulic liquid, and the pressure bottles are also provided for subsequent supply of the pressurized hydraulic liquid to the hydraulic motor for driving the hydraulic motor,
   wherein the hydraulic motor is adapted to act as a hydraulic pump in a hydraulic pump mode,
   wherein a control unit is adapted to switch the hydraulic motor into the hydraulic pump mode for storing retardation energy in the pressure bottles of the apparatus, and
   wherein the connection between the internal combustion engine and the accumulator is via a heat exchanger, thereby creating a combustion engine liquid circuit and a high pressure hydraulic liquid circuit.

2. The apparatus according to claim 1, wherein a first fluid directing pump is provided in the combustion engine liquid circuit between the device transmitting a heat-input and the heat exchanger and a second fluid directing pump is provided in the high pressure hydraulic liquid circuit between the heat exchanger and the accumulator.

\* \* \* \* \*